(12) United States Patent
Aurongzeb et al.

(10) Patent No.: US 11,880,245 B2
(45) Date of Patent: Jan. 23, 2024

(54) RECYCLABLE LIQUID CRYSTAL POLYMER AND POLYETHYLENE FABRIC FOR AN INFORMATION HANDLING SYSTEM COVER

(71) Applicant: Dell Products L.P., Round Rock, TX (US)

(72) Inventors: Deeder M. Aurongzeb, Austin, TX (US); Peng Lip Goh, Singapore (SG); Weijong Sheu, Austin, TX (US); Chad Alan Rabe, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 310 days.

(21) Appl. No.: 17/447,176

(22) Filed: Sep. 8, 2021

(65) Prior Publication Data

US 2023/0073609 A1    Mar. 9, 2023

(51) Int. Cl.
  *G06F 1/16* (2006.01)
  *C08L 23/06* (2006.01)
  *C09K 19/38* (2006.01)

(52) U.S. Cl.
  CPC ............ *G06F 1/1656* (2013.01); *C08L 23/06* (2013.01); *C09K 19/38* (2013.01); *G06F 1/1616* (2013.01); *C08L 2207/062* (2013.01); *C08L 2207/20* (2013.01)

(58) Field of Classification Search
  CPC ..... G06F 1/1601; G06F 1/1613; G06F 1/1656
  See application file for complete search history.

(56) References Cited

U.S. PATENT DOCUMENTS

| | | | | |
|---|---|---|---|---|
| 5,589,236 A | * | 12/1996 | Harvey | B29C 48/10 264/177.1 |
| 6,255,587 B1 | * | 7/2001 | Lambert | B29C 45/14467 174/541 |
| 7,974,660 B2 | * | 7/2011 | Hsu | G06F 1/1601 455/575.8 |
| 9,148,972 B2 | * | 9/2015 | Yeates | G06F 1/1656 |
| 9,365,718 B2 | * | 6/2016 | Luo | B32B 15/08 |
| 2008/0239636 A1 | * | 10/2008 | Hsu | G06F 1/1656 361/679.02 |
| 2012/0314354 A1 | * | 12/2012 | Rayner | H05K 5/0017 361/679.01 |
| 2018/0235084 A1 | * | 8/2018 | Aurongzeb | H05K 3/0064 |
| 2022/0291712 A1 | * | 9/2022 | Baby | C03C 21/002 |

* cited by examiner

*Primary Examiner* — Adrian S Wilson
(74) *Attorney, Agent, or Firm* — NORTON ROSE FULBRIGHT US LLP (57) ABSTRACT

Disclosed is a covering for an information handling system. The covering contains a first layer and a second layer. The first layer comprises a liquid crystal polymer (LCP) and the second layer comprises an ultra-high molecular weight polyethylene (UHMWPE). The use of these low-loss materials in the information handling system cover allows for a low loss tangent covering that provides highly efficient wireless transmission.

20 Claims, 10 Drawing Sheets

RECYCLABLE LIQUID CRYSTAL POLYMER AND POLYETHYLENE FABRIC FOR AN INFORMATION HANDLING SYSTEM COVER

BACKGROUND

A. Field of the Disclosure

This disclosure generally relates to a covering of an information handling system. In certain embodiments, the disclosure describes a covering of an information handling system, said covering being made of materials that provide low wireless signal blockage.

B. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Example hardware and software components may handle the receipt and transmission of information over wireless signal paths to another information handling system. With wireless data transmission speeds at a premium, wireless transmissions are moving to higher wireless frequencies. Many wireless communication networks now operate in the 1 to 10 GHz range, while new applications will run at frequencies as high as 20 GHz.

BRIEF SUMMARY

Increasing frequency of wireless data networks are one factor, sometimes of many factors, that affects the design of information handling systems. For example, as transmission frequency increases, the wireless travel distance shortens and is prone to losses due to blockage when antennas hide behind plastic wall enclosures and suffer loss tangent due to material like plastics, which may have a loss tangent of 0.01-0.02. Other factors may include, for example, chassis design and desired aesthetics for an information handling system.

Plastics are used in many areas of manufacturing and have naturally found application in the construction of information handling systems. Understanding how the materials of construction in such devices perform at these frequencies is a challenge facing designers. For plastics in electronics, awareness of the subtle effects of polymer chemistry, additives, part thickness, and flow patterns aids in optimizing resin selection and part and mold design. Plastics are generally considered insulators, but they can transmit some electrical energy at higher frequencies. The effectiveness of a material as an insulator is usually measured by quantities like dielectric constant (Dk) and dissipation factor (DF). Many variables affect these factors, including the frequency used, filler and additives, part thickness, and environmental conditions such as moisture. Low-loss material electronic device components are needed in order to keep up with the increasing demand for wireless data transmission speed.

Some aspects of the disclosure are directed to a covering for an information handling unit that may address these or other factors of information handling system design. For example, in some embodiments, an information handling system covering can include a first layer and a second layer. The first layer can contain a liquid crystal polymer (LCP). The second layer can contain an ultra-high molecular weight polyethylene (UHMWPE). The second layer contains an inner surface and an outer surface that are on opposite sides of the second layer. The outer surface of the second layer can form at least a portion of an outer surface of an information handling system. The inner surface of the second layer can abut against the first layer along at least a portion of the outer surface of the second layer. The wireless transparency of the ultra-high molecular weight polyethylene material in combination with the apertured fabric configuration work together to provide an outer covering portion that provides exceptional wireless signal transfer capability with appropriate values for dielectric constant and having a low loss tangent that improves data integrity and data rates for data transmitted through a wireless communication network using antennas covered by the fabric. In some embodiments, multiple antennas concealed by fabric may be directional antennas configured to receive a wireless signal within a certain range of angles at the antenna. In some embodiments, the multiple antennas may be configured for operation in the information handling system in a multiple input multiple output (MIMO) configuration.

In some aspects, the LCP has a recycled content of 90% or greater, preferably 95% to 100%, by weight. The LCP can have a recycled content of 90%, 91%, 92%, 93%, 94%, 95%, 96%, 97%, 98%, 99%, 100%, by weight, or any value therein. In some aspects, the LCP content of the first layer is 90 wt. % or greater, preferably 95 wt. % to 100 wt. %, by weight. The LCP content of the first layer can be 90%, 91%, 92%, 93%, 94%, 95%, 96%, 97%, 98%, 99%, 100%, by weight, or any value therein. In some aspects, the LCP can optionally include a reinforcing component, such as carbon fiber or glass fiber. When a reinforcing component is included in the LCP, the reinforcing component can be included in an amount of up to 30% by weight, such as between 10 and 30%. When a reinforcing component is included in the LCP, the reinforcing component can be present in in the LCP in an amount of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, by weight, or any value therein. In some aspects, the LCP has a dielectric constant of less than 4, preferably 1 to 3.8, in a frequency range of 20 kHz to 150 GHz. The LCP dielectric constant can be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, or any value therein, in a frequency range of 20 kHz to 150 GHz. In some aspects, the LCP comprises a thermotropic aromatic polyester, a thermotropic semi-aromatic copolyester, a copolyamide, a polyester-co-amide, or any combination thereof. In some aspects, the first layer is a molded layer, an injected layer, an extruded layer, or a thermoformed layer.

In some aspects, the UHMWPE content of the second layer is 90 wt. % or greater, preferably 95 wt. % to 100 wt. %. The second layer can have a UHMWPE content of 90%, 91%, 92%, 93%, 94%, 95%, 96%, 97%, 98%, 99%, 100%, by weight, or any value therein. In some aspects, at least a portion of the UHMWPE content can be virgin UHMWPE. In some aspects, the UHMWPE can include a virgin UHMWPE content ranging from 10 wt. % to 30 wt. %. In some aspects, the UHMWPE has a weight average molecular weight of 1,000,000 D or greater, preferably 2,000,000 D to 10,000,000 D. The UHMWPE can have a weight average molecular weight of 1,000,000 D, 2,000,000 D, 3,000,000 D, 4,000,000 D, 5,000,000 D, 6,000,000 D, 7,000,000 D, 8,000,000 D, 9,000,000 D, 10,000,000 D, or any value therein. In some aspects, the UHMWPE has a density of 960 to 990 kg/m$^3$. The UHMWPE can have a density of 960, 962, 963, 964, 965, 966, 967, 968, 969, 970, 971, 972, 973, 974, 975, 976, 977, 978, 979, 980, 981, 982, 983, 984, 985, 986, 987, 988, 989, 990 kg/m$^3$, or any value therein. In some aspects, the UHMWPE has a dielectric constant of less than 3, preferably 1 to 2.8 in a frequency range of 20 kHz to 150 GHz. In some aspects, the UHMWPE has a dielectric constant of 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, or any value therein, in a frequency range of 20 kHz to 150 GHz. In some aspects, the UHMWPE has a weight average molecular weight of 1,000,000 D or greater, preferably 2,000,000 D to 10,000,000 D, a density of 960 to 990 kg/m$^3$, and/or a dielectric constant less than 3, preferably 1 to 2.8 in a frequency range of 20 kHz to 150 GHz. In some aspects, the second layer comprises a fabric layer comprising fibers comprising the UHMWPE. In some aspects, the fibers have any one of, any combination of, or all of an average tensile strength of 1 to 5 GPa at 23° C., as measured in accordance with ISO 527; an average tensile modulus of 20 to 200 GPa at 23° C., as measured in accordance with ISO 527; an average elongation at break 2 to 10% at 23° C., as measured in accordance with ISO 527; an average filament diameter of 1 to 50 µm; and an average filament density of 0.5 to 10 denier per filament (dpf).

In some aspects, the first layer of the covering can include one or more grooves. In some aspects, one or more antennas can be positioned within one or more grooves in the first layer. The one or more antennas can be metal stamped antennas, flexible antennas, and/or printed circuit antennas. In some aspects, each groove of the one or more grooves can include a slot and a through-hole. In some aspects, the slot can open to a first surface of the first layer, and the through-hole can extend from the slot to a second surface of the first layer. In some aspects, the first surface can abut against the inner surface of the second layer. In some aspects, the second surface of the first layer is a surface opposite to the first surface of the first layer. In some aspects, the one or more antennas can be independently positioned in the slots, and can be electrically connected to a printed circuit board (PCB) of the information handling system through a connector position within the through-hole. In some aspects, the connector can be a pogo pin, a direct solder, a flexible printed circuit connector, or a pin-type cable connector. In some aspects, the PCB can be detachably attached to the first surface. In some aspects, the PCB can be detachably attached to the first surface through a flex cable. In some aspects, each groove of the one or more grooves can extend from a first opening in a first surface of the first layer, to a second opening in a second surface of the first layer, with the first surface abutting against the inner surface of the second layer, and the second surface situated opposite to the first surface, where the one or more antennas are flexible antennas, and each of the flexible antennas of the one or more antennas can independently be positioned in a groove, with each antenna having a clip shaped structure comprising a first portion positioned in the first opening, a second portion positioned in the second opening, and a bent portion connecting the first portion and the second portion.

In some aspects, the covering has a loss tangent of less than 0.01 at 20 kHz to 110 Ghz. The covering may have a loss tangent of less than 0.01, 0.009, 0.008, 0.007, 0.006, 0.005, 0.004, 0.003, 0.002, 0.001, or any value therein at 20 kHz to 110 Ghz. In some aspects, the covering forms at least a portion of at least one of a front covering or a back covering of the information handling system. In some aspects, the covering forms a palm rest of the information handling system.

According to one example embodiment, a covering for an information handling system can be made. The covering can include a first layer comprising a liquid crystal polymer (LCP) and a second layer comprising an ultra-high molecular weight polyethylene (UHMWPE). The second layer can form at least a portion of an outer surface of the information handling system. The covering can include one or more grooves that comprise a slot and a through-hole, where the slot opens to a first, outer surface of the first layer, and the through-hole extends from the slot to a second, inner surface of the first layer. The first, outer surface can abut against the inner surface of the second layer. One or more antennas can be independently positioned in the slots, and electrically connected to a printed circuit board (PCB) of the information handling system through a connector position within the through-hole. The second layer can be provided in fabric form, thereby providing an aesthetic outer covering that reduces wireless signal blockage due to the thinness and aperture nature of the fabric, and the low loss nature of UHMWPE.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

As used herein, the term "virgin" refers to a component that has not been recycled. The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm"

refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The covering according to aspects of this disclosure can "comprise," "consist(s) essentially of," or "consist of" particular ingredients, components, compositions, etc. disclosed throughout the specification. In one aspect of the present disclosure, and with reference to the transitional phrase "consist(s) essentially of" or "consisting essentially of," a basic and novel characteristic of the present disclosure can include a covering for an information handling system including a first layer containing a liquid crystal polymer (LCP), and a second layer containing an ultra-high molecular weight polyethylene (UHMWPE), wherein an outer surface of the second layer can form at least a portion of an outer surface of the information handling system, and an inner surface of the second layer opposite to the outer surface of the second layer can abut against the first layer along at least a portion of the outer surface of the second layer.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

DETAILED DESCRIPTION

Composite covers for information handling systems according to embodiments disclosed herein may exhibit reduced loss tangent. In some aspects, the composite covers are provided in a bi-layer configuration and can include a liquid crystal polymer layer and an ultra-high molecular weight polyethylene layer. The liquid crystal polymer layer can be up to 100% recyclable, a feature which provides reduced environmental impact and is attractive to consumers. The ultra-high molecular weight polyethylene layer can also be up to 100% recyclable, and may be provided in a fabric form that is tough, light weight, and exhibits good wireless transparency. In some aspects, an antenna is provided between the liquid crystal polymer layer and an ultra-high molecular weight polyethylene layer. The antenna may be a clipped-on antenna that can be easily removed for recycling. In some aspects, the use of an ultra-high molecular weight polyethylene layer in fabric form can reduce wireless signal blockage due to the thinness and low-loss nature of ultra-high molecular weight polyethylene fabric. These and other non-limiting aspects of the present invention are discussed in further detail in the following sections.

Figure 1:
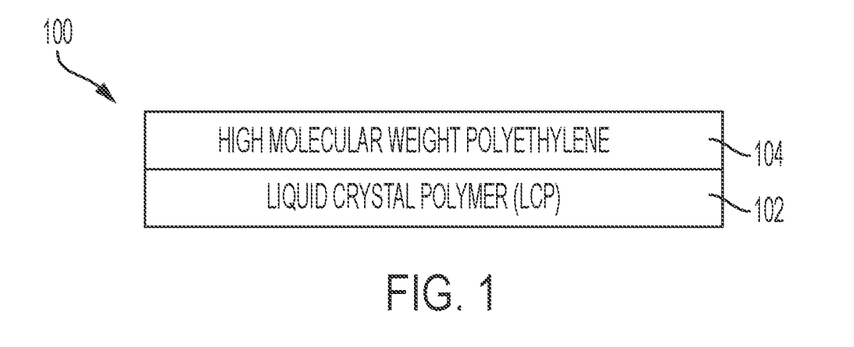
FIG. 1: Schematic depicting layers of a covering for an information handling system according to an example of the present disclosure.

Referring to FIG. 1, the schematic depicts layers of a covering 100 for an information handling system according to an example of the present invention. The first, liquid crystal polymer layer 102 can be an inner, rigid layer that imparts stiffness and structural integrity to the covering. The second, ultra-high molecular weight polyethylene layer 104 can serve as an outer, aesthetic cover of the information handling system cover 100. An outer surface of the second layer 104 forms at least a portion of an outer surface of the information handling system, and an inner surface of the second layer 104 opposite to the outer surface of the second layer 104 abuts against the first layer 102 along at least a portion of the outer surface of the second layer. That is, the second layer 104 does not necessarily abut against the first layer 102 for the entire dimensions of a cover, such as the cover shown in FIG. 2A.

Figure 2A:
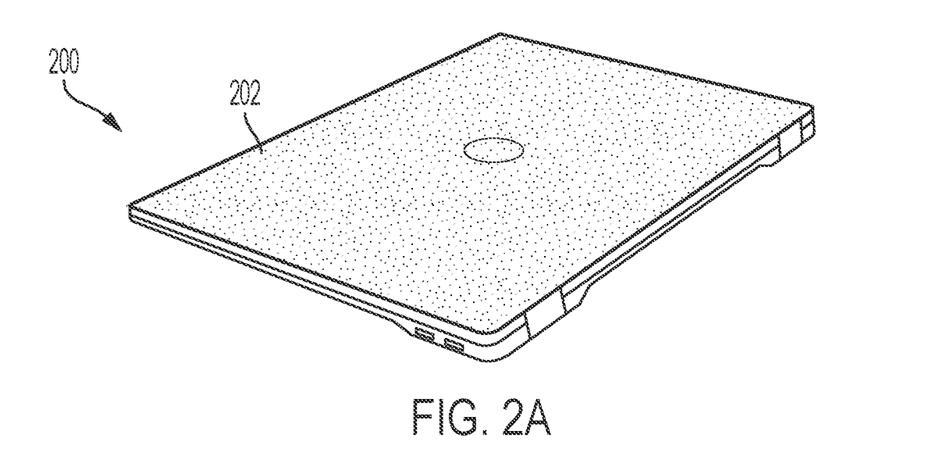
FIGS. 2A-D: Schematics depicting coverings for information handling systems according to the present disclosure.
Figure 2B:
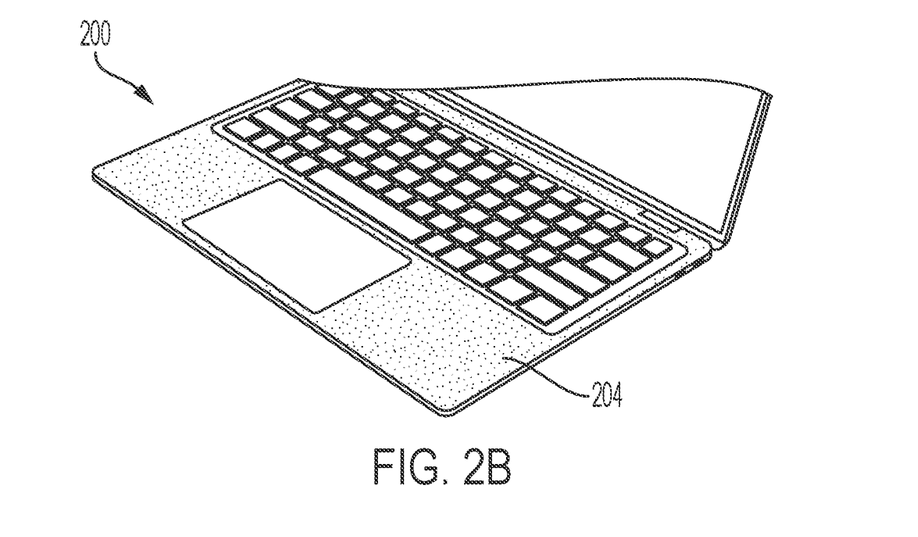
Figure 2C:
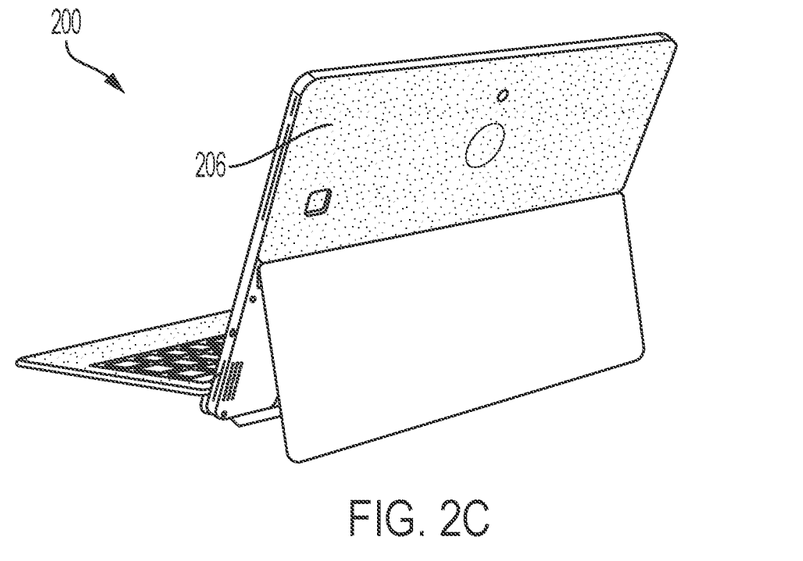
Figure 2D:
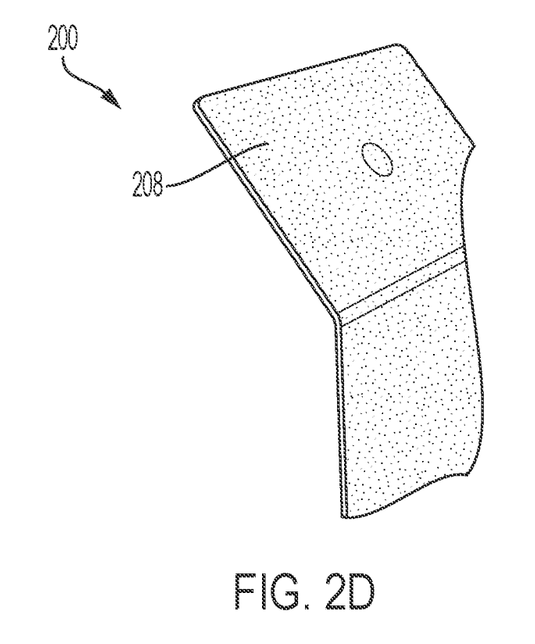

FIGS. 2A-2D depict various embodiments of coverings of the present invention. A: FIG. 2A shows an example laptop computer with an "A" cover according to an example of the present invention. FIG. 2B shows an example laptop computer with a "C" cover according to an example of the present disclosure. FIG. 2C shows an example tablet 2-in-1 PC with a partial "A" cover according to an example of the present disclosure. FIG. 2D shows an example foldable OLED PC with cover according to an example of the present disclosure.

As shown in FIG. 2A, a covering of the present invention can be utilized as an "A" cover 202 for an information handling system 200. The term "A cover" may refer to the cover facing away from the information handling system 200 and/or covering a portion of a chassis on a back side of a display and facing away from the display. Although certain locations for covers are described in embodiments herein, embodiments of the covering may cover other portions of an information handling system or other physical structure. Referring to FIG. 2B, a covering of the present invention can be utilized as a "C" cover 204 for a laptop computer 200. The "C cover" may refer to a covering for a space facing the display when the information handling system is closed and on the same side, facing the same direction, and abutting against a keyboard, trackpad, and/or a secondary display, each of which faces the display when the information handling system is closed. Referring to FIG. 3B, a covering as disclosed herein may be used as a partial A cover 206 for a tablet 2-in-1 PC. As depicted in FIG. 2D, a covering as disclosed herein may be used as a covering for the entire outside surface 208 and enclose a hinge, flexible component, or other means for articulating the angle between two portions of the information handling system 200. Surface 204 is one example of a palm rest for an information handling system. Outside surfaces 202, 206, 208 are examples of a top covering of an information handling system. A surface on an opposite side of cover 204 and facing an opposite direction of cover 204 is an example of a bottom covering of an information handling system.

Figure 3:
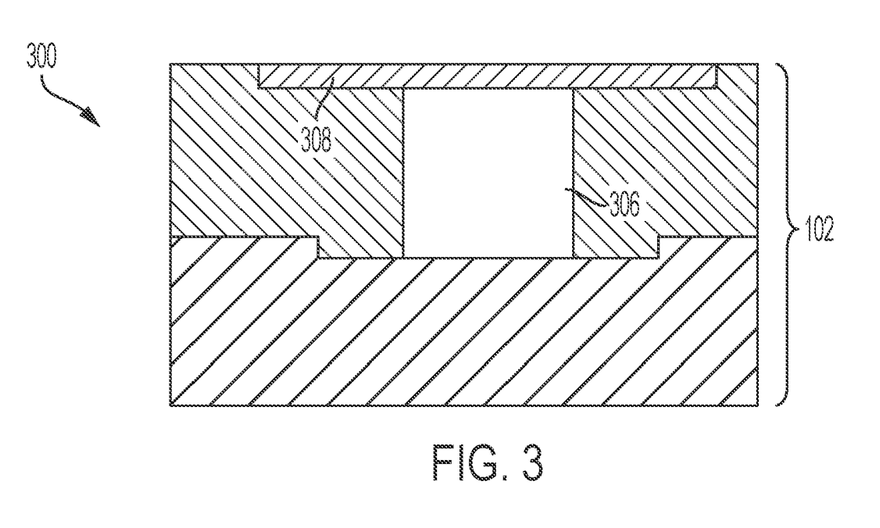
FIG. 3: Schematic depicting cross section of a covering for an information handling system according to an example of the present disclosure.

Referring to the covering cross-section 300 depicted in FIG. 3, one or more antennas 308 can be positioned on or within the covering first layer 102. In some aspects, one or more antennas 308 may be positioned within one or more grooves in the first layer 102. The first layer 102 may include one or more thru-holes 306 for attaching the one or more antennas 308. In some aspects, an antenna 308 may be attached to the covering by being clipped onto the first layer.

Figure 4A:
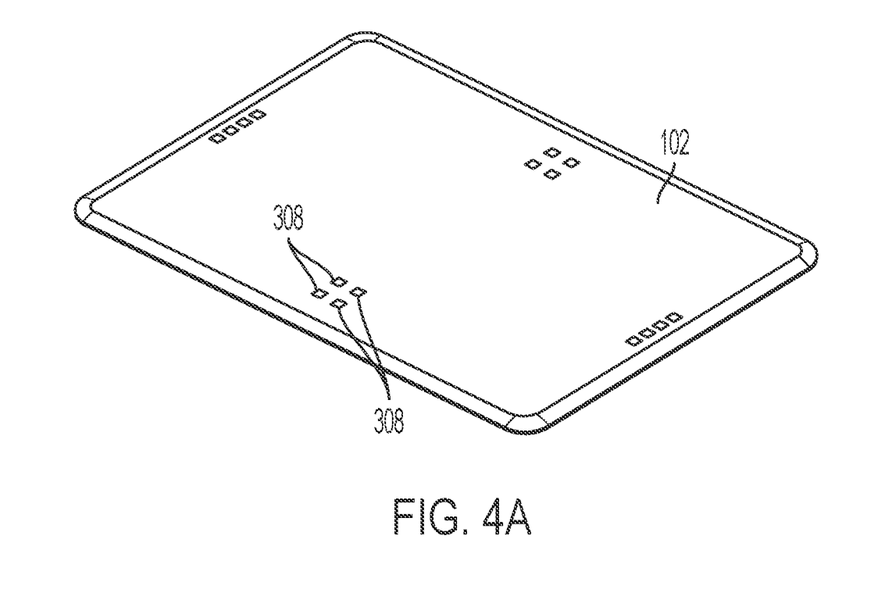
FIGS. 4A-B: Schematics depicting coverings for information handling systems according to the present disclosure.
Figure 4B:
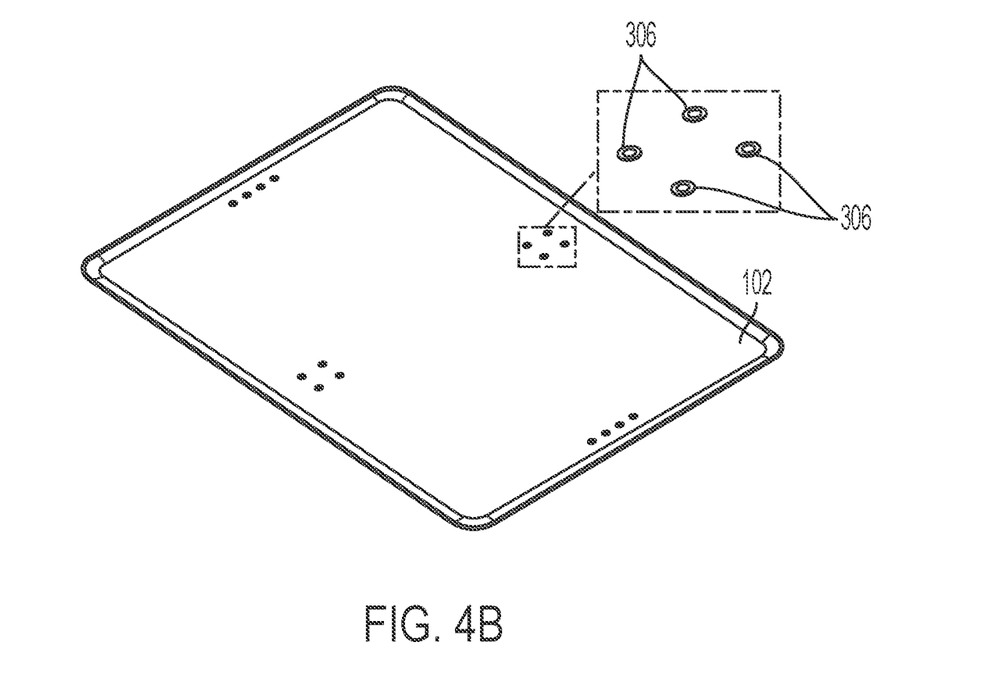

FIGS. 4A-4B depict different views of a first layer of a laptop A cover. In FIG. 4A, the external wall of first layer 102 of a liquid crystal polymer A cover includes clipped-on metal, stamped antennas 308. In FIG. 4B, the internal wall of first layer 102 of the liquid crystal polymer A cover includes multiple thru-holes 306 for attaching one or more antennas, such as by pogo pins that extend through the holes 306 to contact metal antennas.

Figure 5:
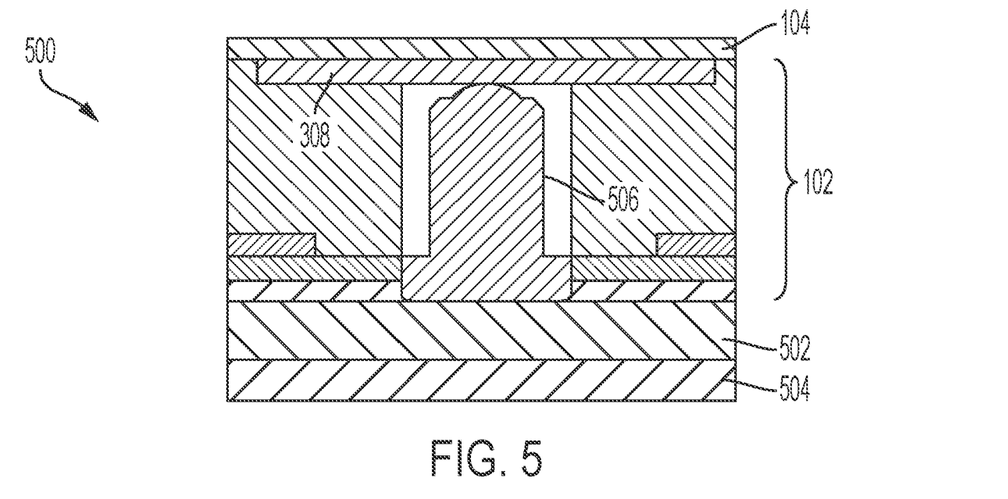
FIG. 5: Schematic depicting cross-section of a LCP/UHMWPE fabric covering for an information handling system according to an example of the present disclosure.

Referring to the covering cross-section 500 depicted in FIG. 5, the covering includes a liquid crystal polymer first layer 102 and an ultra-high molecular weight polyethylene second layer 104 over and covering the first layer 102 and the UHMWP second layer 104. The covering includes a pogo pin assembly with a pogo PCB 502, pogo pin 506, and metal antenna 308.

Figure 6A:
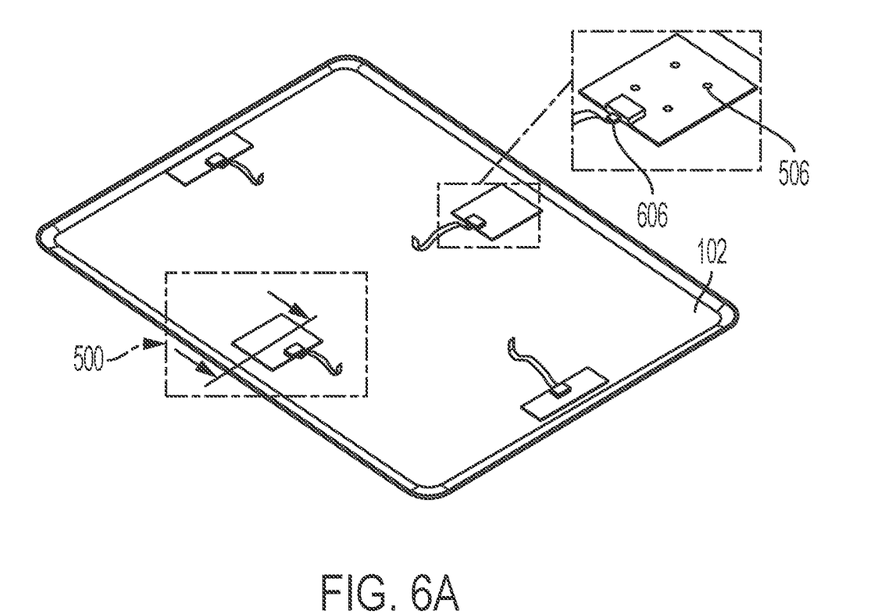
FIGS. 6A-B: Schematics depicting an "A" cover for information handling systems according to the present disclosure.
Figure 6B:
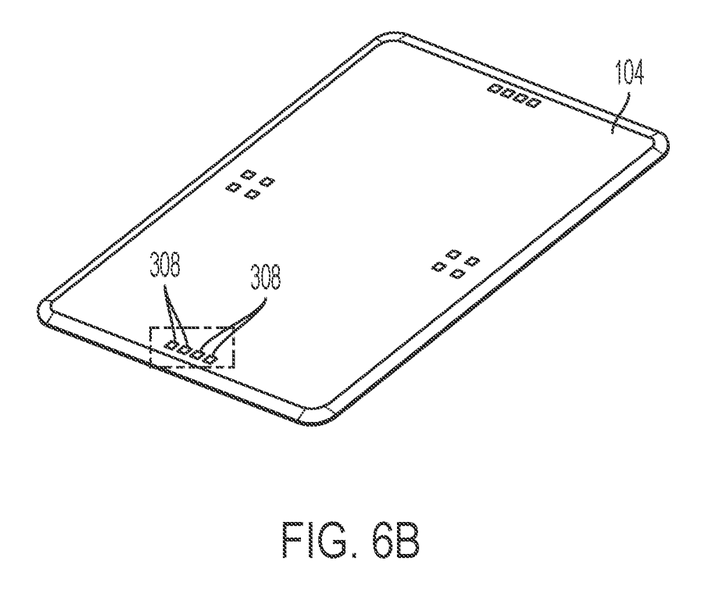

FIGS. 6A-6B depict different views of a first layer of a laptop A cover. FIG. 6A shows an example inside surface of an "A" cover with pogo pin assemblies and a flex cable connected to each pogo pin assembly. FIG. 6B shows an example outside surface of an "A" cover with patch antenna hidden under fabric. In FIG. 6A, the internal wall of the covering depicts first layer 102 and a plurality of antenna PCBs. In some aspects, each PCB can include one or more pogo pins 506 and one or more flex cables 606. In FIG. 6B, the external wall of the covering includes a fabric second layer 104 provided over the first layer 102, with a plurality of patch antennas 308 hidden under the fabric of second layer 104.

Figure 7:
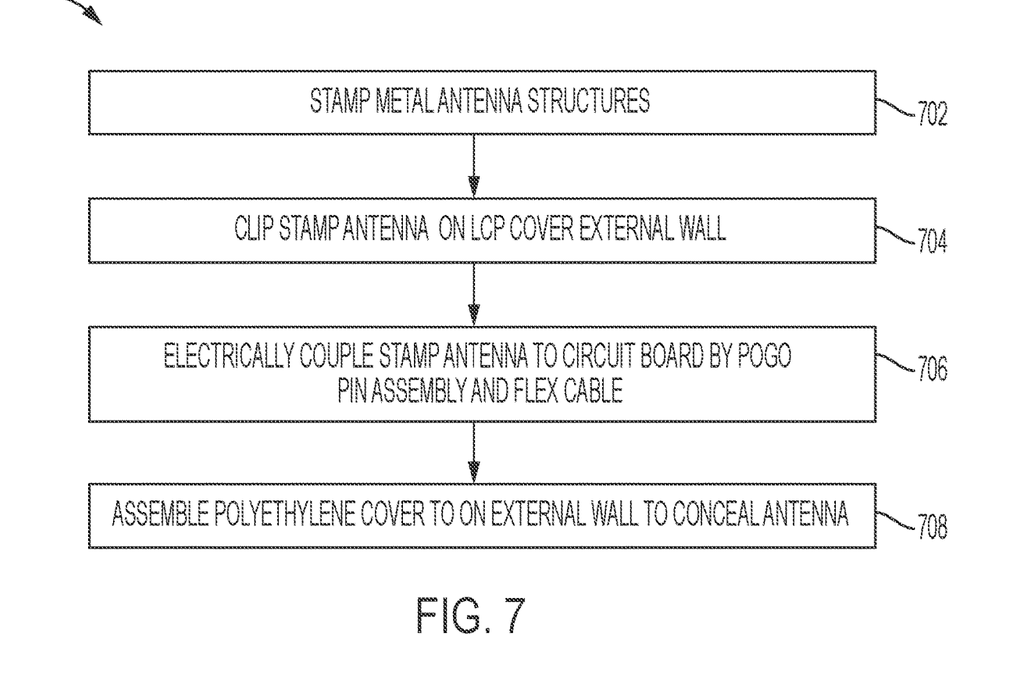
FIG. 7: Schematic of process steps employed for assembling a covering for an information handling system according to an example of the present disclosure.

FIG. 7 depicts a method 700 that may be employed for assembling a covering for an information handling system. In some aspects, metal antenna structures are stamped, at block 702, and subsequently clipped onto the external wall of a liquid crystal polymer first layer, at block 704. The stamped antennas are electrically coupled to a circuit board through a pogo pin assembly and a flex cable at block 706. At block 708, an ultra-high molecular weight polyethylene second layer is attached to the external portion of the first layer, thereby concealing the antennas attached to the underlying liquid crystal polymer first layer.

Figure 8A:
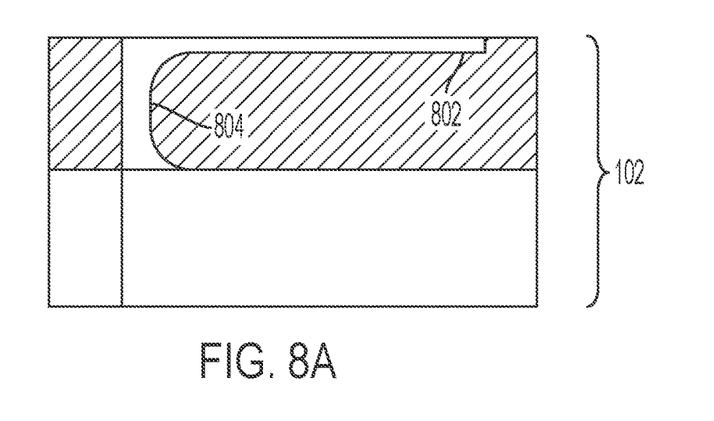
FIGS. 8A-B: Schematics depicting cross-sections of a covering for an information handling system according to an example of the present disclosure.
Figure 8B:
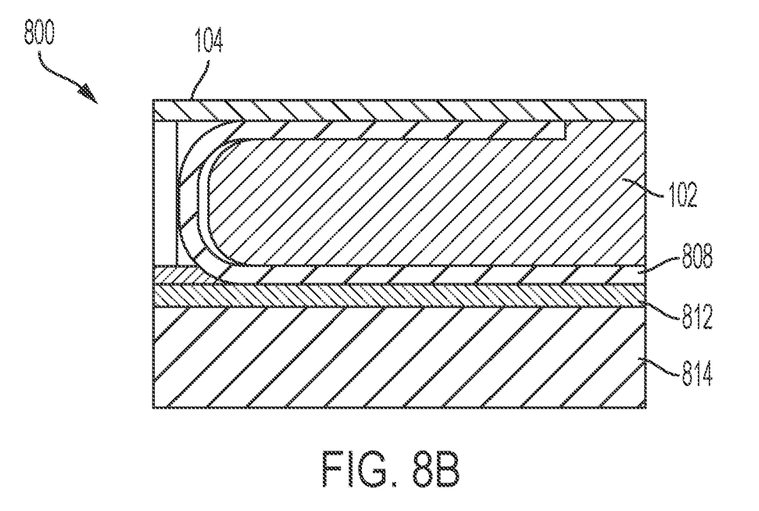

FIGS. 8A-8B depict cross-sections of a covering 800 for an information handling system according to an example of the present invention. FIG. 8A is an example cross-section of a laptop LCP cover layer that includes a thru-slot for a flex circuit to traverse and a flat area for an antenna. FIG. 8B is an example cross-section of a laptop cover layer that includes an LCP layer and a UHMWPE layer. A flex antenna is wrapped over a slot in the cover.

FIG. 8A is a cross-section of a first layer 102 of liquid crystal polymer that includes a flat area space 802 for positioning an antenna. The first layer also includes a thru-slot 804 for a flex circuit to connect to the antenna. Circuitry within the information handling system may couple to an antenna located in the flat area space 802 through a conductor passing through the thru-slot 804.

Another configuration for the antenna and cover is shown in FIG. 8B. FIG. 8B is a cross-section of a covering that includes a liquid crystal polymer first layer 102 and an ultra-high molecular weight polyethylene second layer 104 provided as a fabric. A flex antenna 808 is positioned within the flat area space 802 such that a portion of the antenna abuts the ultra-high molecular weight polyethylene second layer 104 fabric. The wireless transparency of the ultra-high molecular weight polyethylene material in combination with the apertured fabric configuration work together to provide an outer covering portion that provides exceptional wireless signal transfer capability with low loss tangent. An additional layer 812 may be an intermediate high dielectric layer (e.g., dielectric constant less than 10, such as between 2 and 4). An additional layer 814 may be a laptop cover (e.g., fabric or carbon fiber).

Figure 9A:
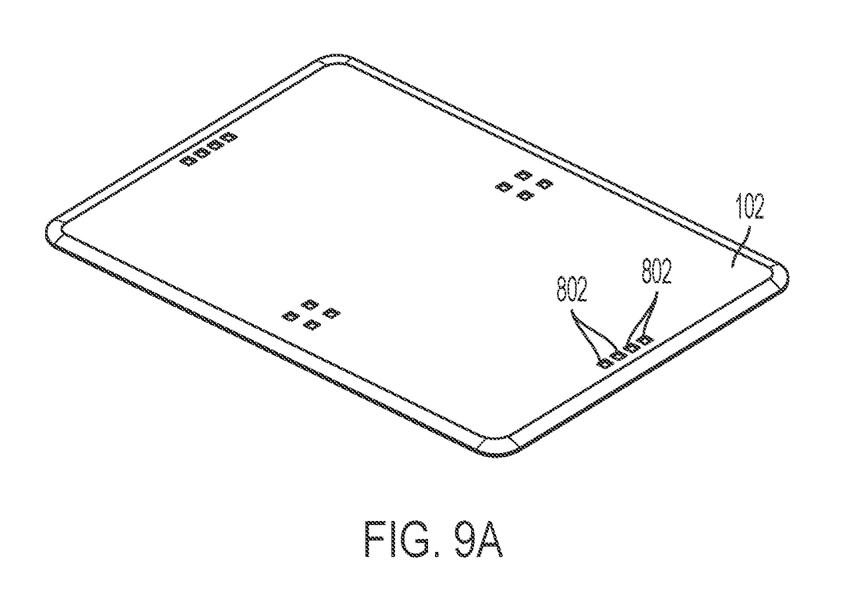
FIGS. 9A-B: Schematics depicting a cover for information handling systems according to the present disclosure.
Figure 9B:
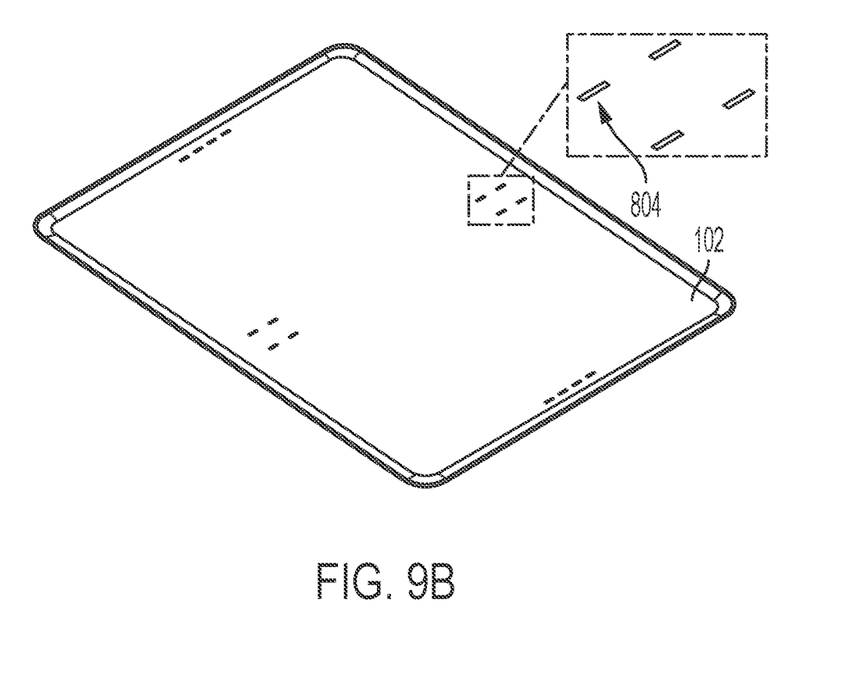

FIGS. 9A-9B depict different views of a first layer of a laptop "A" cover. FIG. 9A shows an example outside surface of an LCP molded cover with slots for flexible circuit antennas. FIG. 9B shows an example inside surface of LCP molded cover with slots for flexible circuit antennas to slot through. Referring to FIG. 9A, the covering first layer 102 is a liquid crystal polymer molded layer that includes a plurality of slots 802 for flexible circuit antennas. In FIG.

9B, the internal wall of the covering first layer 102 includes a plurality of slots 804 through which antennas can slot through.

Figure 10A:
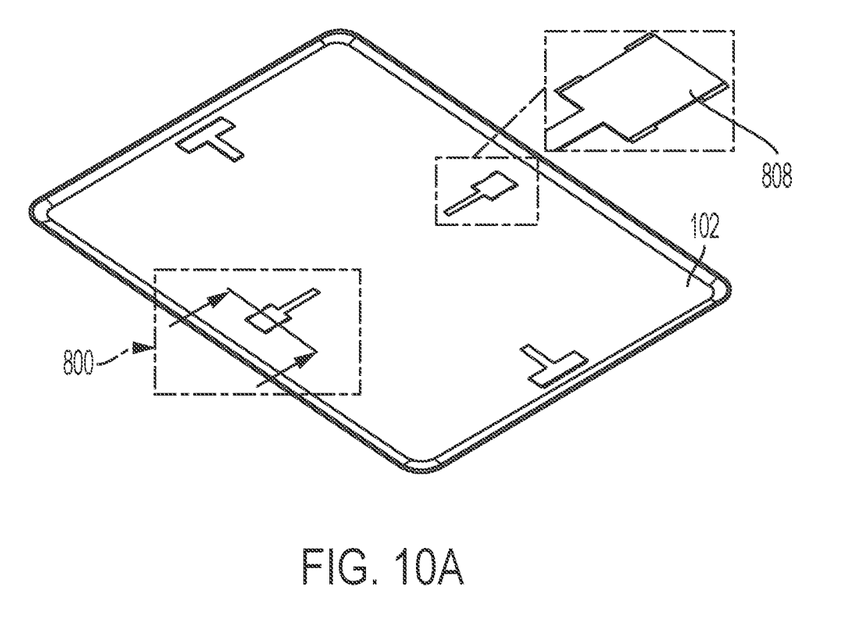
FIGS. 10A-B: Schematics depicting a cover for information handling systems according to the present disclosure.
Figure 10B:
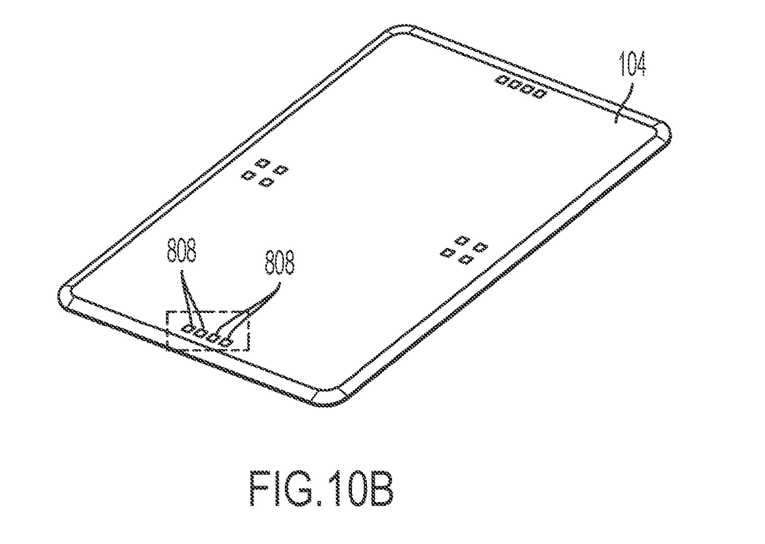

FIGS. 10A-10B depict various embodiments of coverings of the present invention. FIG. 10A shows an example inside surface of a molded cover with flexible printed circuit antennas. FIG. 10B shows an example outside surface of molded cover with a fabric UHMWPE layer. The cover includes patch antenna hidden under the fabric layer. FIG. 10A is an interior view of a covering 800 of the present invention that includes an inner liquid crystal polymer first layer 102 and an outer ultra-high molecular weight polyethylene second layer 104 provided as a fabric. Attached to the first layer 102 are a plurality of flexible printed circuit antennas 808. FIG. 10B is an exterior view of covering 800. An outer ultra-high molecular weight polyethylene second layer 104 in fabric form is provided over the first layer 102. A plurality of antennas 808 are hidden under fabric second layer 104.

Figure 11:
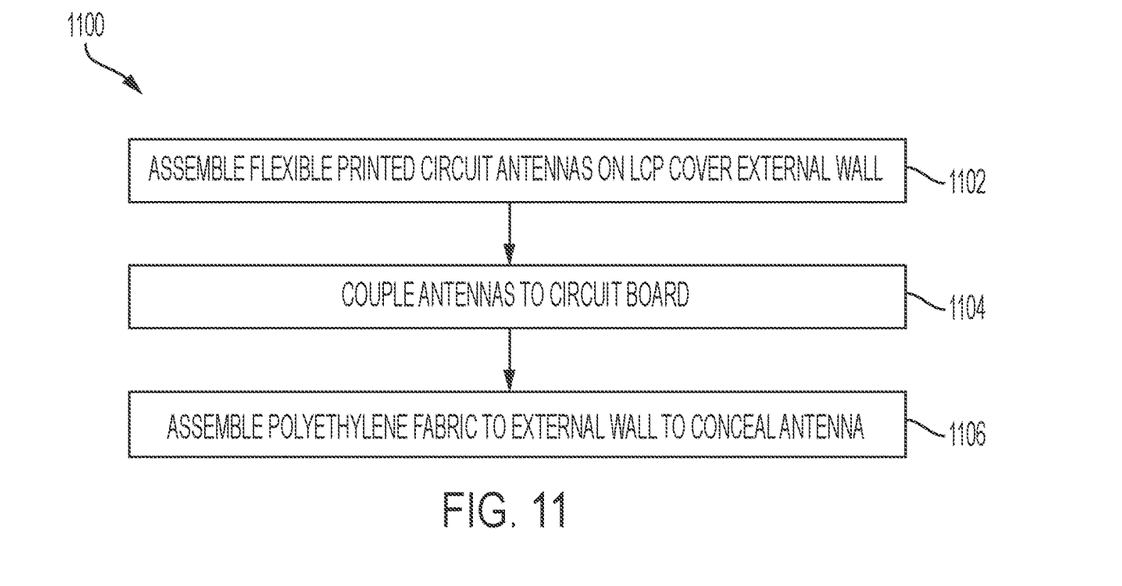
FIG. 11: Schematic of process steps employed for coupling printed circuit antennas to a covering for an information handling system according to an example of the present disclosure.

FIG. 11 illustrates a method 1100 that may be employed for coupling printed circuit antennas to a covering for an information handling system according to an example of the present invention. At block 1102, flexible printed circuit antennas are affixed to the external wall of a liquid crystal polymer first layer 102. At block 1104, the antennas are coupled to circuit boards, e.g., printed circuit boards 502 depicted in FIG. 5. At block 1106, an outer, ultra-high molecular weight polyethylene second layer 104 in fabric form is affixed to the external wall of first layer 102. Affixing the second layer over the external wall of first layer, the second layer conceals antennas that are provided on the external wall of a liquid crystal polymer first layer 102.

Figure 12:
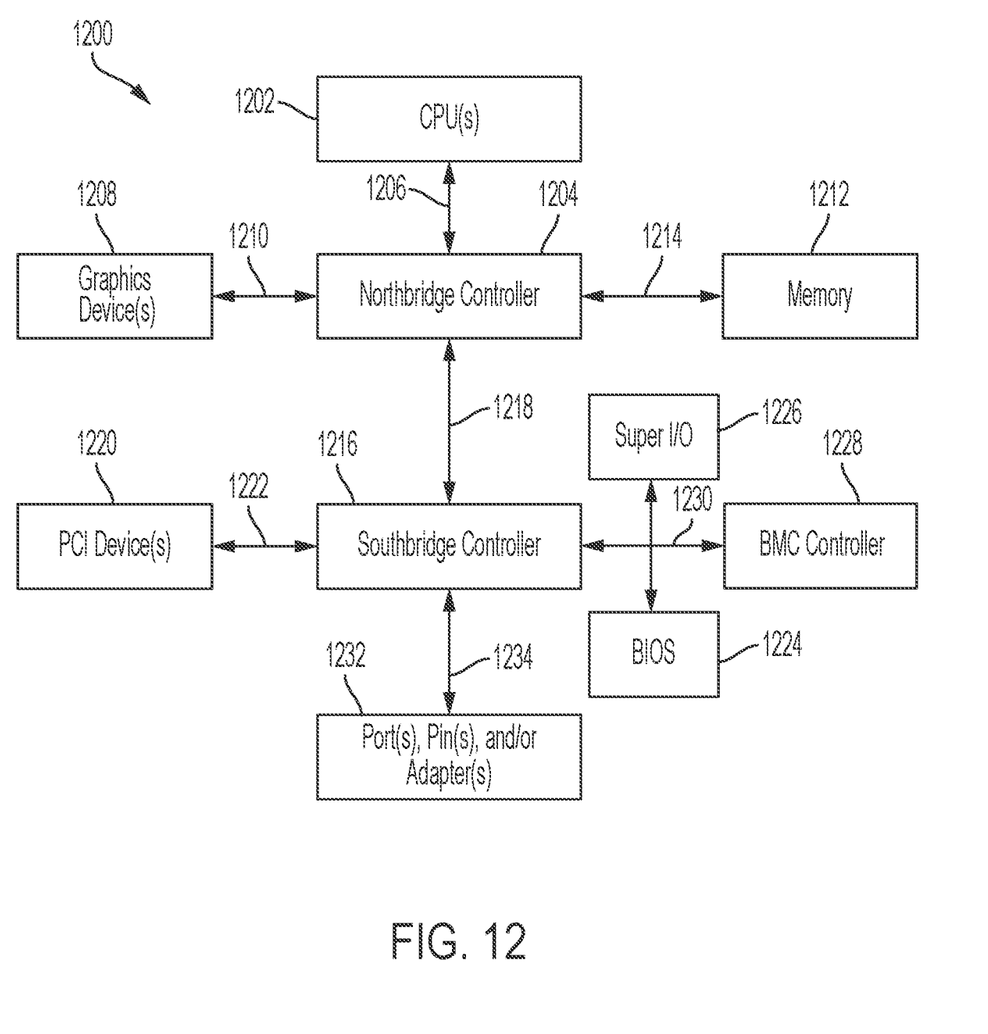
FIG. 12: Schematic of an information handling system according to an example of the present disclosure.

The antenna configurations and cover configurations disclosed according embodiments of this disclosure may be used to provide wireless communications and/or outer coverings for an information handling system, such as the information handling system shown in FIG. 12. FIG. 12 is a block diagram of an information handling system according to some embodiments of the disclosure. An information handling system may include a variety of components to generate, process, display, manipulate, transmit, and receive information. One example of an information handling system 1200 is shown in FIG. 12. Information handling system 1200 may include one or more central processing units (CPUs) 1202. In some embodiments, information handling system 1200 may be a single-processor system with a single CPU 1202, while in other embodiments information handling system 1200 may be a multi-processor system including two or more CPUs 102 (e.g., two, four, eight, or any other suitable number). CPU(s) 1202 may include any processor capable of executing program instructions. For example, CPU(s) 1202 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 1202 may commonly, but not necessarily, implement the same ISA.

CPU(s) 1202 may be coupled to northbridge controller or chipset 1204 via front-side bus 1206. The front-side bus 1206 may include multiple data links arranged in a set or bus configuration. Northbridge controller 1204 may be configured to coordinate I/O traffic between CPU(s) 1202 and other components. For example, northbridge controller 1204 may be coupled to graphics device(s) 1208 (e.g., one or more video cards or adaptors, etc.) via graphics bus 1210 (e.g., an Accelerated Graphics Port or AGP bus, a Peripheral Component Interconnect or PCI bus, etc.). Northbridge controller 1204 may also be coupled to system memory 1212 via memory bus 1214. Memory 1212 may be configured to store program instructions and/or data accessible by CPU(s) 1202. In various embodiments, memory 1212 may be implemented using any suitable memory technology, such as static RAM (SRAM), synchronous dynamic RAM (SDRAM), nonvolatile/Flash-type memory, or any other type of memory.

Northbridge controller 1204 may be coupled to southbridge controller or chipset 1216 via internal bus 1218. Generally, southbridge controller 1216 may be configured to handle various of information handling system 1200's I/O operations, and it may provide interfaces such as, for instance, Universal Serial Bus (USB), audio, serial, parallel, Ethernet, etc., via port(s), pin(s), and/or adapter(s) 1232 over bus 1234. For example, southbridge controller 1216 may be configured to allow data to be exchanged between information handling system 1200 and other devices, such as other information handling systems attached to a network. In various embodiments, southbridge controller 1216 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol. When southbridge controller 1216 or other component of information handling system 1200 communicates wirelessly, the component may be coupled to an antenna concealed by a cover as described in embodiments herein to improve the appearance and durability of the components and maintain high data rates and data integrity over the wireless data networks.

Southbridge controller 1216 may also enable connection to one or more keyboards, keypads, touch screens, scanning devices, voice or optical recognition devices, or any other devices suitable for entering or retrieving data. Multiple I/O devices may be present in information handling system 1200. In some embodiments, I/O devices may be separate from information handling system 1200 and may interact with information handling system 1200 through a wired or wireless connection. As shown, southbridge controller 1216 may be further coupled to one or more PCI devices 1220 (e.g., modems, network cards, sound cards, video cards, etc.) via PCI bus 1222. Southbridge controller 1216 may also be coupled to Basic I/O System (BIOS) 1224, Super I/O Controller 1226, and Baseboard Management Controller (BMC) 1228 via Low Pin Count (LPC) bus 1230.

Information handling system 1200 may be configured to access different types of computer-accessible media separate from memory 1212. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to information handling system 1200 through various interfaces, such as universal serial bus (USB) interfaces, via northbridge controller 1204 and/or southbridge controller 1216. Some such mediums may be coupled to the information handling system through a Super I/O Controller 1226 combines interfaces for a variety of lower bandwidth or low data rate devices. Those devices may include, for example, floppy disks, parallel ports, keyboard and mouse and other user input devices, temperature sensors, and/or fan speed monitoring.

BIOS 1224 may include non-volatile memory having program instructions stored thereon. The instructions stored on the BIOS 1224 may be usable by CPU(s) 1202 to initialize and test other hardware components. The BIOS 1224 may further include instructions to load an Operating System (OS) for execution by CPU(s) 1202 to provide a user interface for the information handling system 1200, with such loading occurring during a pre-boot stage. In some embodiments, firmware execution facilitated by the BIOS 1224 may include execution of program code that is compatible with the Unified Extensible Firmware Interface (UEFI) specification, although other types of firmware may be used.

BMC controller 1228 may include non-volatile memory having program instructions stored thereon that are usable by CPU(s) 1202 to enable remote management of information handling system 1200. For example, BMC controller 1228 may enable a user to discover, configure, and/or manage BMC controller 1228. Further, the BMC controller 1228 may allow a user to setup configuration options, resolve and administer hardware or software problems, etc. Additionally or alternatively, BMC controller 1228 may include one or more firmware volumes, each volume having one or more firmware files used by the BIOS firmware interface to initialize and test components of information handling system 1200.

One or more of the devices or components shown in FIG. 12 may be absent, or one or more other components may be added. Further, in some embodiments, components may be combined onto a shared circuit board and/or implemented as a single integrated circuit (IC) with a shared semiconductor substrate. For example, northbridge controller 1204 may be combined with southbridge controller 1216, and/or be at least partially incorporated into CPU(s) 1202. Accordingly, systems and methods described herein may be implemented or executed with other computer system configurations. In some cases, various elements shown in FIG. 12 may be mounted on a motherboard and enclosed within a chassis of the information handling system 1200.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A covering for an information handling system, the covering comprises:
   a first layer comprising a liquid crystal polymer (LCP); and
   a second layer comprising an ultra-high molecular weight polyethylene (UHMWPE),
   wherein an outer surface of the second layer forms at least a portion of an outer surface of the information handling system, and an inner surface of the second layer opposite to the outer surface of the second layer abuts against the first layer along at least a portion of the outer surface of the second layer.

2. The covering of claim 1, wherein the LCP has a recycled content of 90% or greater.

3. The covering of claim 1, wherein the LCP content of the first layer is 90 wt. % or greater.

4. The covering of claim 1, wherein the LCP has a dielectric constant less than 4, preferably 1 to 3.8, in a frequency range of 20 kHz to 150 GHz.

5. The covering of claim 1, wherein the LCP comprises at least one of a thermotropic aromatic polyester, a thermotropic semi-aromatic copolyester, a copolyamide, or a polyester-co-amide.

6. The covering of claim 1, wherein the first layer is a molded layer, an injected layer, an extruded layer, or a thermoformed layer.

7. The covering of claim 1, wherein the UHMWPE has a weight average molecular weight of 1,000,000 D or greater, a density of 960 to 990 kg/m$^3$, and/or a dielectric constant less than 3 in a frequency range of 20 kHz to 150 GHz.

8. The covering of claim 1, wherein the UHMWPE content of the second layer is 90 wt. or greater.

9. The covering of claim 1, wherein the second layer comprises a fabric layer comprising fibers comprising the UHMWPE.

10. The covering of claim 9, wherein the fibers have any one of, any combination of, or all of:
    an average tensile strength of 1 to 5 GPa at 23° C., as measured in accordance with ISO 527,
    an average tensile modulus of 20 to 200 GPa at 23° C., as measured in accordance with ISO 527,
    an average elongation at break 2 to 10% at 23° C., as measured in accordance with ISO 527,
    an average filament diameter of 1 to 50 μm, and
    an average filament density of 0.5 to 10 denier per filament (dpf).

11. The covering of claim 1, further comprising one or more antennas positioned within one or more grooves in the first layer.

12. The covering of claim 11, wherein the one or more antennas are metal stamped antennas, flexible antennas, and/or printed circuit antennas.

13. The covering of claim 11,
wherein each groove of the one or more grooves comprises a slot and a through-hole, wherein the slot opens to a first surface of the first layer, and the through-hole extends from the slot to a second surface of the first layer,
wherein the first surface abuts against the inner surface of the second layer, and the second surface is a surface opposite to the first surface, and
wherein the one or more antennas are metal stamped antennas, and each metal stamped antennas of the one or more antennas are independently positioned in the slots, and are electrically connected to a printed circuit board (PCB) of the information handling system through a connector position within the through-hole.

14. The covering of claim 13, wherein the connector is a pogo pin, a direct solder, a flexible printed circuit connector, or a pin-type cable connector.

15. The covering of claim 13, wherein the PCB is detachably attached to the first surface.

16. The covering of claim 15, wherein the PCB is detachably attached to the first surface through a flex cable.

17. The covering of claim 11,
wherein each groove of the one or more grooves extends from a first opening in a first surface of the first layer, to a second opening in a second surface of the first layer,
wherein the first surface abuts against the inner surface of the second layer, and the second surface is opposite to the first surface, and
wherein the one or more antennas are flexible antennas, and each of the flexible antennas of the one or more antennas are independently positioned in a groove, and has a clip shaped structure comprising a first portion positioned in the first opening, a second portion positioned in the second opening, and a bent portion connecting the first portion and the second portion.

18. The covering of claim 1, wherein the covering has a loss tangent of less than 0.01 at 20 kHz to 110 Ghz.

19. The covering of claim 1, wherein the covering forms at least a portion of at least one of a front covering or a back covering of the information handling system.

20. The covering of claim 1, wherein the covering forms a palm rest of the information handling system.

* * * * *